United States Patent [19]

Tarnedde

[11] 4,397,274

[45] Aug. 9, 1983

[54] LAWN MOWER HAVING INTERNAL COMBUSTION ENGINE AND A STARTING DEVICE

[76] Inventor: Franz Tarnedde, Braunschweiger Strasse 1, D 3353 Bad Gandersheim, Fed. Rep. of Germany

[21] Appl. No.: 131,365

[22] Filed: Mar. 18, 1980

Related U.S. Application Data

[63] Continuation of Ser. No. 874,647, Feb. 2, 1978, abandoned.

[30] Foreign Application Priority Data

Feb. 8, 1977 [DE] Fed. Rep. of Germany ....... 2705066
Nov. 8, 1977 [DE] Fed. Rep. of Germany ....... 2749813

[51] Int. Cl.[3] .............................................. F02N 1/00
[52] U.S. Cl. .................................. 123/185 BB; 74/512; 74/519; 123/185 A; 56/10.8
[58] Field of Search ......... 123/185 B, 185 BB, 185 A, 123/185 C, 185 R, 179 SE; 56/10.8; 74/512, 513, 519

[56] References Cited

U.S. PATENT DOCUMENTS

| | | | |
|---|---|---|---|
| 1,065,708 | 6/1913 | Morgan | 123/185 BB |
| 1,099,685 | 6/1914 | Bennett | 123/185 BB |
| 1,128,911 | 2/1915 | Smith | 123/185 BB |
| 1,206,986 | 12/1916 | Carson | 123/185 BB |
| 3,018,768 | 1/1962 | Thompson | 123/185 BB |
| 3,626,937 | 12/1971 | Gjovik | 123/185 BB |
| 4,257,367 | 3/1981 | Fujikawa et al. | 123/185 BB |

FOREIGN PATENT DOCUMENTS

| | | | |
|---|---|---|---|
| 440121 | of 1912 | France | 123/185 BB |
| 573344 | of 1924 | France | 74/519 |

*Primary Examiner*—Ira S. Lazarus
*Assistant Examiner*—Magdalen Moy
*Attorney, Agent, or Firm*—Michael J. Striker

[57] ABSTRACT

A lawn mower driven by an internal combustion engine and having a foot operated starter for the engine; the pedal lever for the starter is pivotably supported on the mower body and is provided with at least one guiding pulley or roller around which the spring biased cord for actuating the starter is guided to increase the speed of actuation of the starter during the downward movement of the pedal; the pull arm of the pedal lever can be made as a leaf spring to further accelerate the starter cord.

1 Claim, 11 Drawing Figures

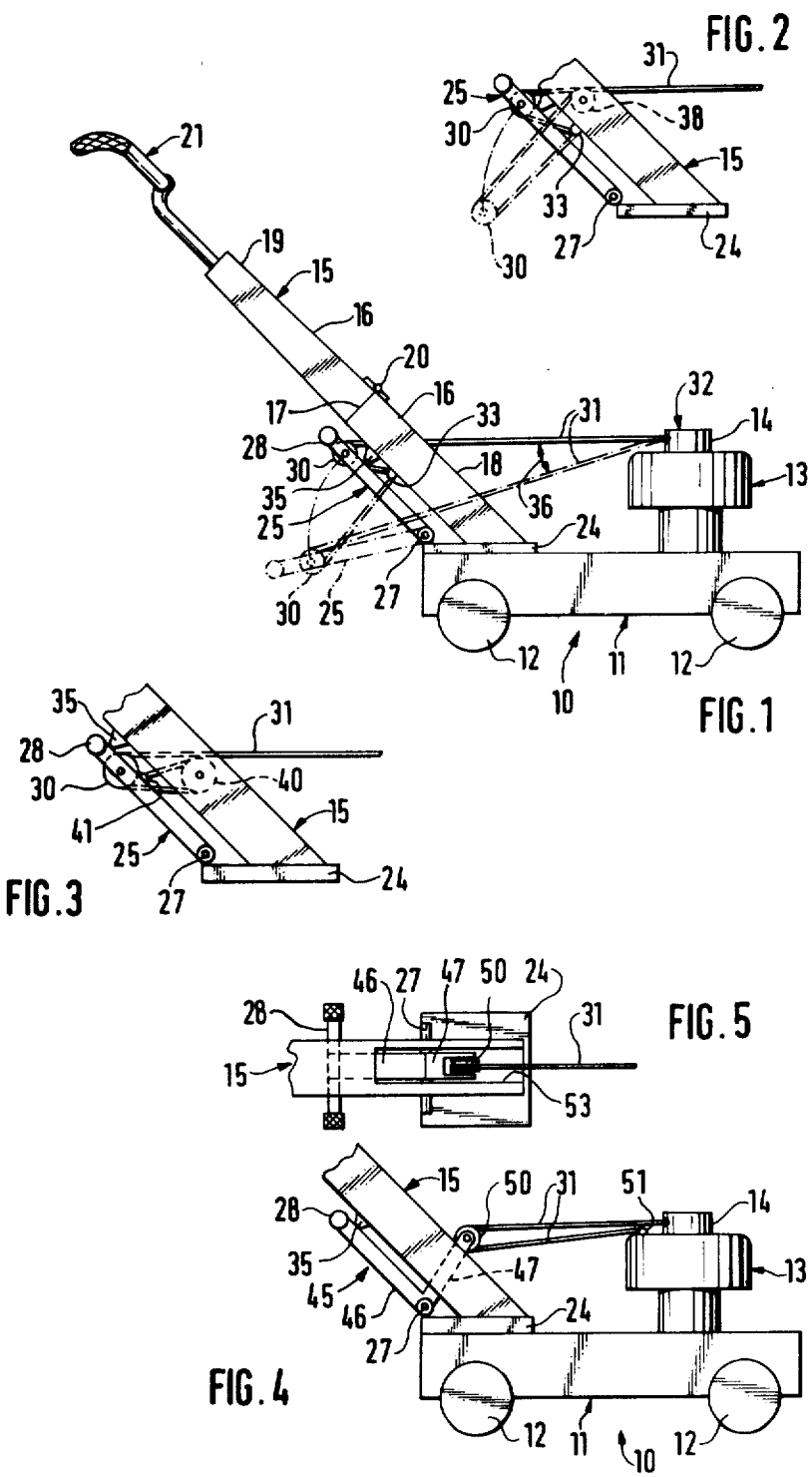

LAWN MOWER HAVING INTERNAL COMBUSTION ENGINE AND A STARTING DEVICE

This is a continuation of application Ser. No. 874,647, filed Feb. 2, 1978 now abandoned.

BACKGROUND OF THE INVENTION

This invention relates to a lawn mower having an internal combustion engine as its prime mover and a starting device for the engine.

More particularly, the invention relates to a lawn mower of the type having a foot operated starting device for the combustion engine as described in my German patent application No. P 26 23 517.6.

SUMMARY OF THE INVENTION

An object of this invention is to provide a lawn mower of the above described type having an improved foot operated starting device.

Another object of this invention is to facilitate the operation of such starting device.

According to this invention, the above objects and others which will become apparent hereafter, are attained by pivotably supporting a foot operated arm on a swivel axis provided on the mower body and further by supporting for rotation on this arm a guiding roller around which passes the starter cord for actuating the starting device; the guiding roller is disposed at a distance from the swivel axis and the starter cord is guided around the guiding roller and has its free end connected to the mower body.

In a modification, there is provided a second guiding roller supported for rotation on the mower body and in this case the starter cord is guided around both rollers and has its free end attached to the foot operated arm. It is advantageous to depress the foot operated arm or pedal from an elevated normal position to a lower actuated position whereby the spring biased starter cord is pulled from a starter attachment on the starting device. Due to the simple or multiple guiding of the starter cord around the guiding roller or pulley on the pedal or around the two guiding rollers provided respectively on the pedal and on the mower body, it is possible to transform in a suitable range the rotational movement of the foot operated arm or pedal into an increased speed of the starter cord. This improved characteristic feature of the pulling action of the starter cord is particularly desirable in that part of the starting cycle where, upon the overcoming of the initial compression force in the internal combustion engine, it is of importance to pull out or redraw as fast as possible the starter cord from the starter attachment. If desired, the starter cord can be guided around more than two pulleys or guiding rollers to form a kind of a tackle or a pulley block.

According to one embodiment of this invention the starter cord is guided past one guiding roller which is rotatably supported on the mower body and subsequently past the guiding roller arranged on the pivotable foot operated lever. The portion of the starter cord extending between the starter attachment and the first mentioned guiding roller does not exhibit any tilting during the starting operation.

The afore-mentioned objects of this invention are also attained by providing an angular lever the vertex of which is pivotably supported on a swivel axis disposed on the mower body; one arm of the angular lever is formed as a foot operated arm or pedal and the other arm is employed as pull arm which at a distance from the swivel axis, supports a guiding roller; a starter cord of the starter device which passes around the guiding roller and has its free end connected either to the mower body or in the case of another guiding roller supported on the mower body, to the rotatable pull arm.

Conventionally, the starter cord is retracted into the starter attachment of the starter device by means of a spring. The force of this spring is set so large that it pulls, by means of the starter cord, the foot operated arm or the angular arm into the starting or rest position thereof. In using the angular lever it is sufficient to employ a relatively short starter cord since the pull arm is closer to the starter attachment than the foot operated arm.

According to one embodiment of this invention the path of rotational movement of the guiding roller is in the range of substantially horizontal planes corresponding to the substantially horizontal position of the starter cord. By this arrangement the displacement of the portion of the starter cord which extends between the starter attachment and the guiding roller is kept to a minimum. In another embodiment of this invention the angle between the foot operated arm and the pull arm of the angular lever is between 60° and 85°. This angular range insures that at least approximately horizontal guiding of the starter cord is attained during the starting operation and at the same time a sufficient angular displacement of the foot operated arm is obtained.

Preferably, the foot operated arm is longer than the spacing between the swivel axis and the guiding roller.

According to another modification of this invention, the foot operated arm or pedal and the pull arm are tiltable relative to each other, and at a distance from the swivel axis at least one tension spring is connected between the foot operated arm and the pull arm. In this manner the foot operated arm may be pressed down to act against the force exerted by the tension spring or tension springs about a relatively large angle, whereas the pull arm, until the resistance of compression of the internal combustion is overcome, at least approximately remains in its starting or rest position. The tension spring or springs thus act as energy storing means. Energy stored or accumulated therein reinforces the starting swing of the pull arm as soon as the latter is set in motion in the starting direction. In this manner the speed of retraction of the starter cord is thus considerably increased and starting of the internal combustion engine is facilitated.

In still another embodiment of this invention the maximum angular swing between the foot operated arm and the pull arm is limited by a stopping or limiting device. The stopping device may, for example, employ a rope which may be attached between the foot operated arm and the pull arm, or corresponding buffers located in the range of and opposite the support of the tiltable foot operated arm and the pull arm.

In another embodiment of this invention the foot operated arm, when in its rest or normal position, abuts upon the steering device of the lawn mower. As described previously, the foot operated arm is kept in this normal or rest position by the spring bias of the starting cord. As a steering device there may be employed, for example, a conventional steering grip or handle attached on both sides of the housing or body of the lawn mower.

A symmetrical and space-saving arrangement of the steering device results when, according to another feature of this invention, the pull arm of the angle lever projects through a passage provided in the steering device.

Furthermore, according to this invention at least one part of the rotational movement of the pull arm and of the guiding roller is enclosed in a protective housing provided on the steering device. If, according to another feature of this invention, the free end of the starter cord is attached to this protective housing, the starter cord may be made particularly short. The free end of the starter cord may, however, also be attached to the combustion engine if no protective housing is provided.

In another embodiment of this invention the steering device includes a tubular part or pillar which is connected to the body or housing of the mower. This tubular part may be arranged in the central longitudinal plane of the mower and supports on its upper end the steering handle for controlling the driving wheels.

To save space during transport and storage of the lawn mower the steering device according to another feature of this invention, may be transversely divided and equipped with at least one hinge for tilting-down the upper part of the steering device. In the tilted position the upper part of the steering device may abut upon the aforementioned protective housing.

In still another embodiment of this invention the foot operated arm and/or the pull arm includes at least one leaf spring. By this means it is possible to increase considerably in a simple and space saving manner the spring constant of one or both arms of the angular lever. In another modification of this invention each resilient arm is provided, on its side facing the starter cord and in the vicinity of the swivel axis, with a substantially rigid guiding member having an outwardly bent apart. In stressing the resilient arms the spring part thereof gradually abuts on the bent part of the rigid guiding member whereby the load of the resilient part of the arm is uniformly distributed and the life of the spring is increased.

According to another embodiment of this invention the path of movement of the angular lever in the starting direction is limited only by a single stop arranged on the mower body preferably in the proximity of the swivel axis. This arrangement makes it possible that the resilient arm portion, which is provided between the coupling member for the starter cord and the buffer or the limiting member of the angular lever, may due to its spring force continue moving in the starting direction even if the angular lever impinges against the stopping or limiting member. By means of this resilient "overshoot" of one arm of the angular lever, the starter cord is drawn out of the starting device with a particularly increased acceleration advantageously takes place during the decisive last starting phase and, consequently, the starting of the engine is considerably improved.

A similar effect can be achieved even if no stopping or limiting devices are employed when the swing or down movement of the foot operated arm is interrupted after passng a sufficiently long path.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of an embodiment of the lawn mower of this invention having a simple foot operated starter pedal;

FIG. 2 is a cut-away part of FIG. 1 showing a modification of the foot operated arm;

FIG. 3 is a side view of a part of the mower of FIG. 1 showing still another modification of the foot operated tackle arrangement of the starting cord to achieve an increased transmission ratio for the cord;

FIG. 4 is a side view of a part of another embodiment of this invention having a foot operated angular lever for operating the starter cord;

FIG. 5 is a plan view of a part of the mower of FIG. 4;

DESCRIPTION OF THE PREFERRED EMBODIMENTS

Figure 6:
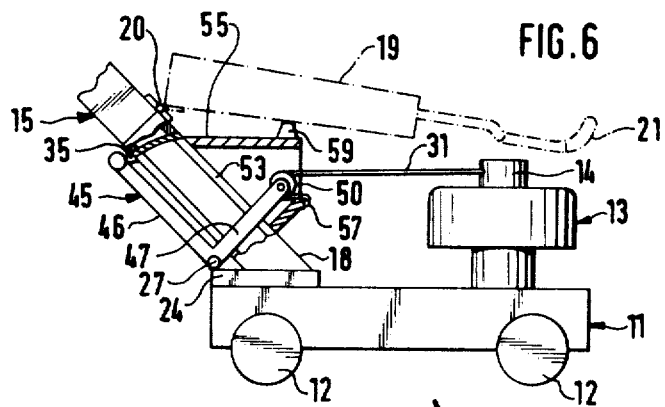
FIG. 6 is a side view of still another embodiment of the mower of this invenion showing a protective housing and a tiltable steering pillar.

According to FIG. 1, the lawn mower 10 includes a housing 11, wheels 12, an internal combustion engine 13 which is provided with a starter attachment 14, and a steering device 15. A tubular part or pillar 16 of the steering device 15 is transversely divided approximately midway of its length along the jointing plane 17. The resulting lower part 18 and the upper part 19 of the steering device 15 are connected by means of a hinge 20 and in the operative position as illustrated in FIG. 1 the two parts are locked together by locking means not shown in the drawing. The upper part 19 of the steering device 15 is further provided with a steering handle 21 to facilitate the movement and steering of the mower 10.

A foot operated arm 25 for starting the engine 13 is pivotably supported on a swivel axis 27 which is connected to a foot plate 24 provided on housing 11 and connected to the lower part 18 of the steering device 15. The free end of the foot operated arm 25 is provided with a tubular end piece 28 extending transversely past both sides of the pillar 16; in starting the mower the operator steps upon one projecting part of the tubular end piece 28 and presses it down with his foot.

A guiding roller 30 is supported for free rotation on the foot operated arm 25 in the proximity of the tubular end piece 28 and a spring biased starter cord 31 extending from the starting device 32 passes around this guiding roller 30. In this embodiment the free end of the starter cord 31 is secured at a mounting point 33 to the lower part 18 of the steering device 15. The starter cord 31 is normally drawn or retracted into the starter attachment 14 of the starting device 32 by spring bias. This spring bias is so large as to always force the foot arm 25 from any instant position into its fully elevated or rest position illustrated in FIG. 1. In this rest position the foot operated arm 25 abuts upon a buffer 35 disposed on the steering device 15.

In starting the internal combustion engine 15, the operator steps on the arm 25 and, as the case may be, after several light taps to find the compression point of the engine 13, forcibly presses down the pedal or arm 25 to its end position as indicated in FIG. 1 by dotted lines. Due to this action, the starter cord 31 which is guided around the guiding roller 30 is quickly withdrawn from the starter attachment 14 and consequently the operation of engine 13 is effortlessly initiated. In the end position of the pedal or foot operated arm 25 the starter cord 31 is tilted downwardly about an angle 36.

This tilting motion of the starter cord 31 can be avoided by providing a second guiding roller (FIG. 2) which is freely rotatable and supported on the steering device 15. The starter cord 31 engages the guiding roller 38 prior to its passing around the guiding roller 30.

According to FIG. 3, the starter cord 31 is first guided around the guiding roller 30 supported for free rotation on the tiltable foot operated arm 25 and then it is guided past a second guiding roller 40 which is supported for free rotation on the steering device 15. The free end of the starter cord 31 in this case is attached at a mount point 41 to the swingable foot operated arm 25. In this manner the two guiding rollers 40 together with the spring biased starter cord 31 form a tackle arrangement which further increases the transmission ratio for the starter cord 31; consequently, at a constant speed of the foot operated arm 25 during its downward movement the speed of drawing the starter cord 31 out of the starter attachment 14 is increased. Consequently, the starting of the engine can be made quick and without trouble.

As shown in FIG. 4 an angular lever 45 which is formed of a foot operated arm 46 and a pull arm 47, is tiltably supported on a swivel axis 27. The foot operated arm 46 corresponds to the previously described foot operated arm 25 and supports on its free end a tubular piece 28. On the free end of the pull arm 47 there is pivotably supported a guiding roller 50 around which the starter cord 31 is guided and reversed in direction before the free end of the starter cord 31 is attached to a mounting point 51 on the internal combustion engine 13.

According to FIG. 5, the pull arm 47 together with its guiding roller 50 passes during its tilting movement through a passage or opening 53 in the steering device 15, the opening 53 has a size sufficient to accommodate the arm 47 with a certain lateral tolerance.

FIG. 6 illustrates a protective housing 55 which is provided on the lower part 18 of the steering device 15 in the direction to the combustion engine 13. The protective housing 55 is dimensioned to provide sufficient room for the pull arm 47 and its roller 50 during their swing. The free end of the starter cord 31 is secured at a mounting point 57 to the protective housing 55.

Figure 7:
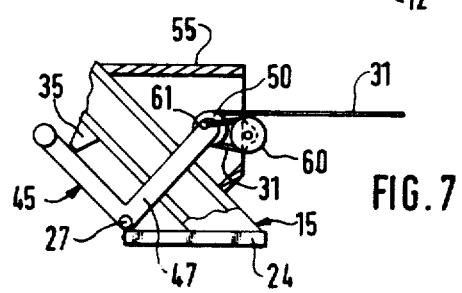
FIG. 7 is a side view of a cutaway part of FIG. 6 showing a tackle like arrangement having rollers for the starter cord.

FIG. 6 shows the upper part 19 of the steering device which is indicated by a dash-and-dot line in its transport or storage position in which the upper part 19 is folded about the hinge 20 and rests upon a buffer 59 provided on top of the protective housing 55. FIG. 7 shows again a tackle arrangement of two guiding rollers 60, 61 and of the starter cord 31 which produces a still faster pull-out of the cord 31 from the starter attachment than that achieved by a single roller 50 in FIG. 6. The guiding roller 60 is supported for free rotation on the protective housing 55 and the roller 61 is rotatably supported on the ends of the pull arm 47. The starter cord 31 first passes around the guiding roller 61, subsequently around the second roller 60 and finally it is secured at its free end to a mounting point 61 on the pull arm 47.

Figure 8:
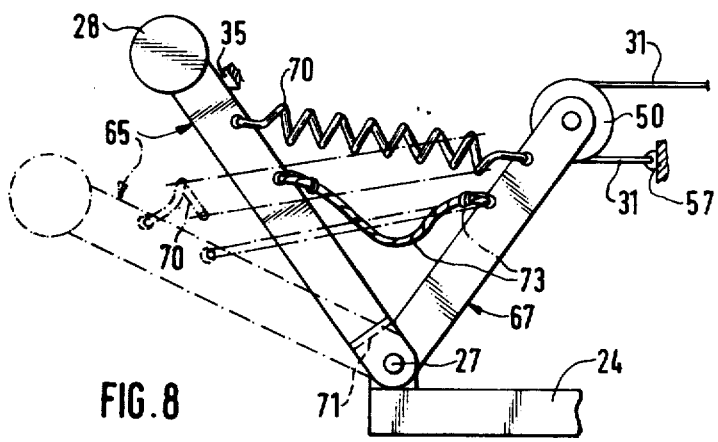
FIG. 8 is a side view of another variation of the foot operated angular lever having mutually tiltable lever arms.

In the modification of this invention as shown in FIG. 8, the foot operated arm 65 and the pull arm 67 are tiltable relative to each other and are rotatably supported on a swivel axis 27. The full lines in FIG. 8 indicate the foot operated arm 65 as well as the pull arm 67 in their initial or rest position in which the foot operated arm 65 abuts upon a buffer 35 on a steering device (not shown). Between the foot operated arm 65 and the pull arm 67 is secured a tension spring 70 which exerts upon the pull arm 67 a spring force that is larger than the spring bias transmitted from the starter attachment through the starter cord 31 to the pull arm 67. Consequently, the pull arm 67 is forced by the tension spring 70 to rotate in the direction of the foot operated arm 65 and stops against a fork 71 which is provided at the lower end of the foot operated arm 65.

Between the foot operated arm 65 and the pull arm 67 there is further provided a wire or rope 73 which as indicated in FIG. 8 by full lines, is in its position in which it loosely sags.

If, in order to start the engine 13 the foot operated arm 65 is pressed down from its elevated rest position as illustrated in full lines in FIG. 8, to its depressed position illustrated by dotted lines in FIG. 8 during which movement, however, the pull arm 67 still remains in its initial rest position due to the compression resistance of the combustion engine 13 which still prevails. As a result, the tension spring 70 is extended and accumulates energy; in the depressed position of the foot operated arm 65 as indicated by the dotted line, the wire rope 73 becomes tight so that no additional angular increase between the foot operated arm 65 and the pull arm 67 takes place. In further pressing down the foot operated arm 65 from its depressed position as indicated by dashed line in FIG. 8, the compression resistance of the engine is overcome and the starter cord 31 is withdrawn from the starter attachment 14. Upon the overcoming of the initially considerable compression resistance of the combustion engine 14, the stretched tension spring 70 resumes its contracted position and during its contraction, accelerates the pull arm 67 in the direction towards the foot operated arm 65 whereby an increased angular speed is imparted to the pull arm 67 in addition to the angular speed imparted by the foot operated arm 65. In this manner, the starter cord 31 is pulled out at particularly increased speed and the starting operation can be performed easily and quickly.

Figure 9:
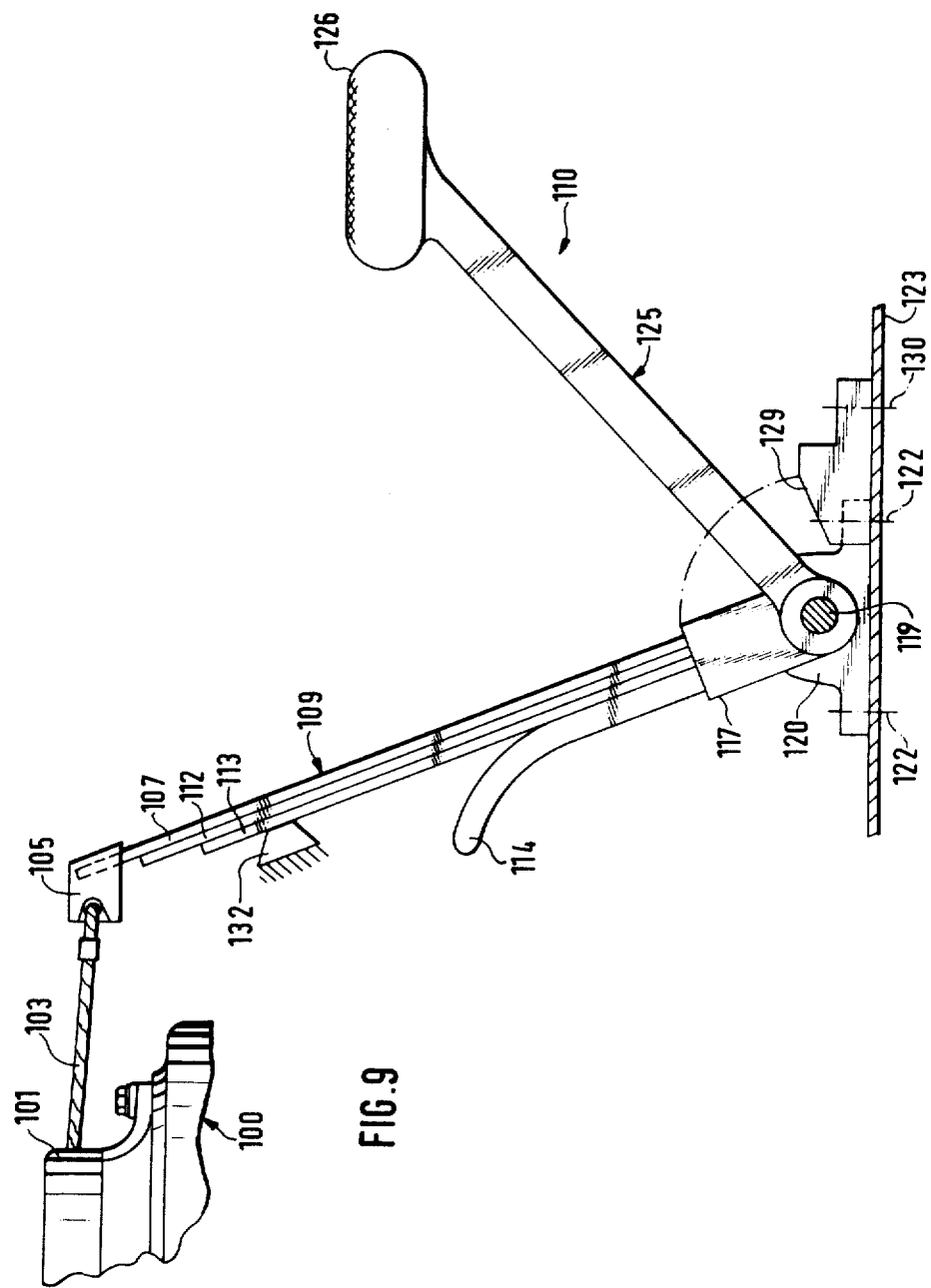
FIG. 9 is a side view of still another embodiment of the foot operated angular lever having a resilient pull arm.

In FIG. 9 is shown a cut-away portion of an internal combustion engine 100 provided with a starter attachment 101 in which a starter cord 103 is held under a predetermined spring bias and the outwardly projecting free end of the starter 103 is secured to a coupling piece 105.

The coupling piece 105 in turn is attached to a free end of a leaf spring 107 which forms a major part of a pull arm 109 of an angular lever 110. The leaf spring 107 in the pull arm 109 is further reinforced by additional leaf springs 112 and 113 and by an outwardly bent rigid guiding member 114; the leaf springs 107, 112 and 113 as well as the guiding member 114 are firmly secured in a mounting support 117.

The mounting support 117 is attached to shaft 119 which at its free ends is rotatably supported in bearing blocks 120 of which only one is shown in FIG. 9. The bearing blocks 120 are connected by bolts 122 to a housing 123 of a lawn mower (not shown).

The shaft 119 is further rigidly connected to one end of the foot operated arm 125 of an angular lever 110. To the other end of the lever 125 is connected a pedal 126.

In the path of rotation of the mounting support 117 there is provided a stop 129 secured to the housing 123 by bolts 130.

In pressing down the pedal 126 from its rest position as shown in FIG. 9, the angular lever 110 is rotated clockwise. The free ends of leaf springs 107, 112 and 113 initially take no part at all or take part only to a negligible extent, in the movement of the remaining parts of the angular lever 110, because the starter cord 103 is kept stationary due to the compression resistance of the internal combustion engine. In continuing the pressing down of the pedal 126 the leaf springs 107, 112 and 113 gradually bend down whereby the side of the spring 113 facing the bent guiding member 114 gradually approaches and abuts on the bent part of the rigid guiding member 114 while energy is gradually stored in those leaf springs. This energy is released when the compression resistance of the combustion engine 100 is overcome and accelerates the pull out of the starter cord 103 from the starter attachment 101. In this manner starter gears contained in the starter attachment 101 are accelerated in an advantageous manner and the starting process is improved.

At the right hand end of the rotational path of angular lever 125 as indicated by dashed line in FIG. 9, the mounting support 117 abuts upon the stop 129. Nonetheless by stopping the mounting support 117, the leaf springs 107, 112 and 113, do not stop immediately but continue to swing clockwise and pull out the starter cord 103 from the starter attachment 101 at a particularly high speed.

As soon as the pedal 126 is released, the starter cord 103 is wheeled into the starter attachment 101 by means of a spring (not shown) arranged in the starter attachment and by this action the angular lever 110 is tilted counterclockwise until the rear side of the leaf spring 113 stops against an abutment 132 provided on the lawn mower body and this position of the pull arm defines the normal or rest position of the foot operated lever 126.

Figure 10:
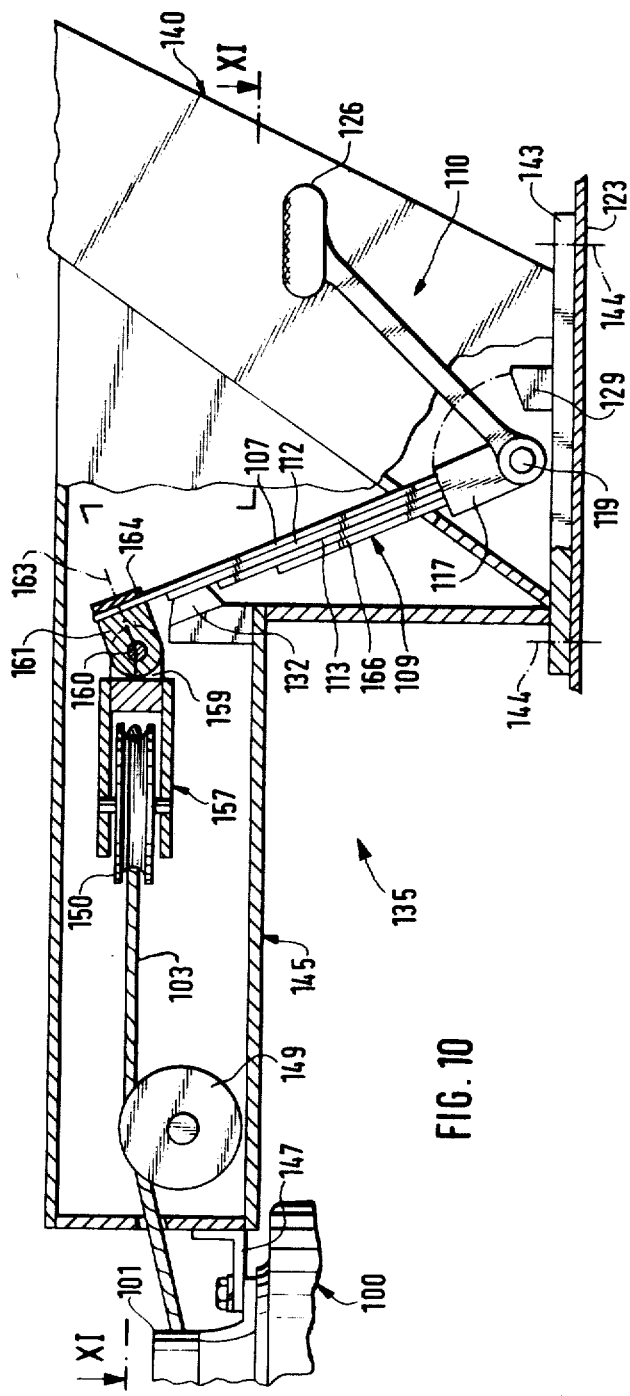
FIG. 10 is a sectional side view of still another embodiment of the lawn mower of this invention having a foot operated angular lever with one resilient arm and a tackle arrangement for the starting cord.
Figure 11:
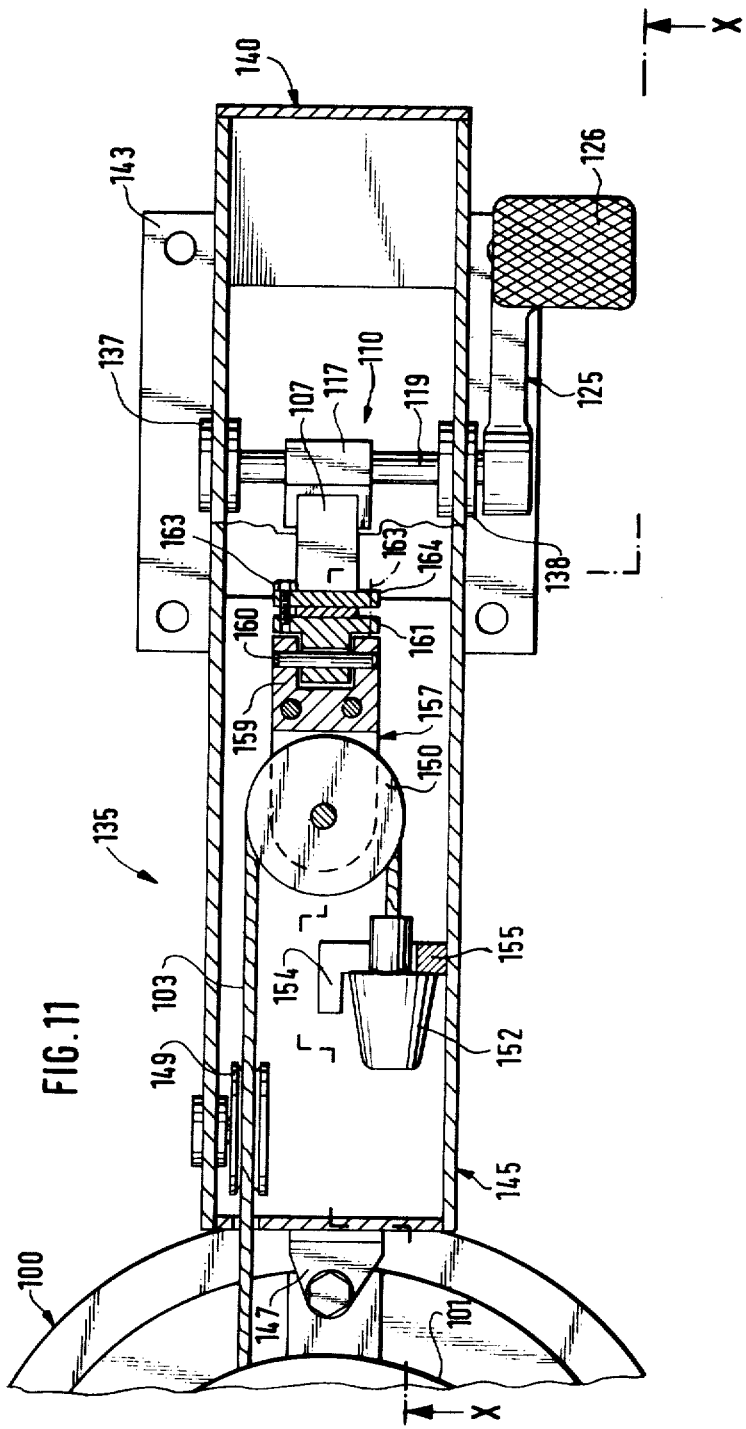
FIG. 11 is a sectional plan view of the arrangement of FIG. 10.

FIGS. 10 and 11 show a foot operated part 135 of a starting device wherein the elements corresponding to those in FIG. 9 are designated by like reference numerals.

The shaft 119 which is rotatably supported in bearings 137 and 138 is provided on a pillar like steering device 140. The steering device 140 and the stop 129 are secured to a base plate 143 which is connected by bolts 144 to a housing or body 123 of the lawn mower.

A protecting device 145 is secured at one side to the base plate 143 and to the steering device 140, and on the other side it is connected by a suitable angle 147 to the starter attachment 101.

The starter cord 103 is guided first past a guiding roller 149 which is rotatably supported on the protective housing 145, and subsequently the cord 103 passes around a roller 150. A series-connected mounting piece 152 at one end of the starter cord 103 engages a notch 154 in a holding angle 155 secured to the protective housing 145 and in this manner holds the free end of the cord 103 in a fixed position. The roller 150 is supported for rotation in a roller block 157 which is provided with a bifurcated connecting piece 159. The connecting piece includes a pin 160 on which link 161 is pivotably supported. The free end of the link 161 is connected by means of bolts 163 and a counterplate 164 to the free end of the leaf spring 107.

The pull arm 109 in this embodiment does not include the rigid guiding member (114 in FIG. 9) but is provided instead with an additional leaf spring 166 which, however could be replaced by the previously described rigid bent member.

By means of the roller 150 and by resting the free end of the starter cord 103 in the clamping member 152, there results in the starting device of FIGS. 10 and 11 a transformation of forces which causes the desired acceleration of the starting movement, and this acceleration facilitates the starting process. The starting device 135 can be readily installed in conventional mass produced lawn mowers in lieu of the hand operated starting devices with which such mowers are conventionally provided.

In mass produced starter attachments 101 a spring biased take-up reel for the starter cord 103 has an effective diameter of about 90 mm, for example. In the embodiment shown in FIG. 10 it is, however, more advantageous to employ a take-up reel having a smaller effective diameter of, for instance, about 35 mm. At the same time, the ratio between the foot operated arm or lever 125 and the pull arm 109 is preferably 1:1.38.

While the invention has been illustrated and described as embodied in a lawn mower, it is not intended to be limited to the details shown, since various modifications and structural changes may be made without departing in any way from the spirit of the present invention.

What is claimed as new and desired to be protected by Letters Patent is set forth in the appended claims:

1. In a lawn mower including drive means having an internal combustion engine and a starter attachment for said engine, a combination comprising a swivel axis; an angular lever pivotably supported on said axis, one arm of said angular lever forming a foot-operated arm and the other arm forming a pull arm; a starter cord springbiased into a rest position and retractable from said starter attachment by means of said pull arm; leaf spring means forming at least a portion of one of said arms of said angular lever and being adjusted to bias said starter cord in a starting direction upon actuation of said lever and upon overcoming the starting resistance of the engine to impart an additional impulse to said starter attachment; and wherein said one arm including said leaf spring means comprises an abutment member having an outwardly directed bent portion for limiting the deformation of said leaf spring means.

* * * * *